United States Patent [19]

Fogerson

[11] Patent Number: 4,526,093
[45] Date of Patent: Jul. 2, 1985

[54] APPARATUS FOR PROCESSING POTATOES

[75] Inventor: Richard D. Fogerson, Ontario, Oreg.

[73] Assignee: Ore-Ida Foods, Inc., Boise, Id.

[21] Appl. No.: 602,518

[22] Filed: Apr. 20, 1984

[51] Int. Cl.³ .............................................. A23N 7/00
[52] U.S. Cl. ..................................... 99/584; 426/481; 99/537; 99/567; 99/588
[58] Field of Search ................ 99/501, 504, 506, 507, 99/537–541, 567, 584, 587, 588, 590, 591, 593; 426/481, 441, 637, 514, 808

[56] References Cited

U.S. PATENT DOCUMENTS 2,630,849  3/1953  Williams ............................... 99/504
4,420,494 12/1983  Glantz ................................... 426/637

Primary Examiner—Timothy F. Simone
Attorney, Agent, or Firm—Burns, Doane, Swecker & Mathis

[57] ABSTRACT

Apparatus and process for recovering the skins from baked potato parts and for recovering the potato meat that is scooped out of potato shells. Cupped shaped molds arranged to firmly hold potato halves in tray assemblies positioned at predetermined space points are attached to a conveyor that rotates about a first stationary drum. Cutter units form part of knife assemblies which are on the outer periphery of an opposed parallel rotating drum which assemblies are positioned at predetermined spaced locations corresponding to that of the cup shaped molds on the first stationary drum. The location of the molds and knives and their movement around the axis of their respective drums are synchronized so that when they are at the points at which they are closest during their movement about the axis of the respective drums the meat can be scooped from the potato by the knives to prepare the potato skins and the extracted meat can be recovered.

11 Claims, 7 Drawing Figures

APPARATUS FOR PROCESSING POTATOES

BACKGROUND OF THE INVENTION

This invention relates to the processing of baked potatoes, and more particularily it relates to a method and apparatus for scooping meat from half of a baked potato or the like and recovering the skin and the potato meat as food products.

The nutritional value of potato skins has long been known and in recent years they have become a popular food product. Potato meat from a baked potato or other cooked potato is frequently used in the preparation of the products. However, it is a difficult task to mechanically scoop the meat from a baked potato and recover both the shell and the meat so that the shell or skin is in satisfactory condition for marketing. It is generally necessary to conduct such operation by hand. Equipment for holding fruits such as citrus fruits which have been cut in half are also well known but these are not satisfactory for the intended purpose of the present invention because in those instances the shell or skin of the fruit is subjected to rough treatment. Consequently, such equipment would not be satisfactory for marketing an edible potato skin product where it is important that it be of good quality and have a measured thickness of retained meat.

It is the object of the present invention to provide an efficient apparatus for recovery of potato shells from parts of cooked potatoes such as the half shell of a baked potato. It is a further object to conduct the operation with equipment wherein the potato skin is recovered in good condition while having a retained wall thickness, or depth of potato meat, within the potato shell.

BRIEF SUMMARY OF THE INVENTION

The invention is to an apparatus and process for the preparation of potato skins and recovery of potato meat from cut baked potatoes. The mechanism has holding and cutting units on which the potato parts are processed. A first stationary cylindrical drum has continuous roller chain conveyor means travelling around its outer wall which carries a plurality of tray assemblies laterally disposed across the outer drum wall and parallel to the central axis of the drum. Cup-shaped molds are positioned in the trays and are adapted to receive the potato part to be processed. The potato parts are firmly held in the cup-shaped molds by a vaccuum during the processing step.

A second drum which is rotatable and is spaced parallel in relation to the first stationary drum has a plurality of knife assemblies attached to its outer wall at predetermined radially spaced positions about its outer periphery corresponding to the mold positions of the tray assemblies. Cutter units comprising a plurality of blades form part of the knife assemblies positioned at points corresponding to the positions of the cup-shaped molds. The chain conveyor travelling about the stationary drum and the rotating drum move at the same angular speed so that the cutter units and the cup-shaped molds are synchronized to meet at a point where the respective parts on the parallel drums are closest to each other so that the blades of the cutter units readily scoop the meat from the potato parts to an adjusted depth. Both the potato skin with its retained meat and the potato meat that has been removed are recovered.

A more complete understanding of the invention can be had by reference to the accompanying drawings.

DRAWINGS

DESCRIPTION OF THE INVENTION

The apparatus of this invention is intended primarily for the preparation of potato skins by removing the potato meat or pulp from a cut baked potato by scooping or digging the meat and then recovering both the shell and the meat. The shell or skin is intended for preparation as a foodstuff and the pulp can be used in a known manner for preparing various edible foodstuffs and the like.

The machine is mounted in a frame F (see FIG. 1) comprised of a pair of upper and lower horizontal cross members 101 and 102, respectively, and of vertical support members 103, 104 and 105, respectively. Trusses 106 are provided to reinforce the above-identified horizontal and vertical support members. Floor coasters 107 are positioned at the foot of each of the vertical supports 103 and 104.

Figure 2:
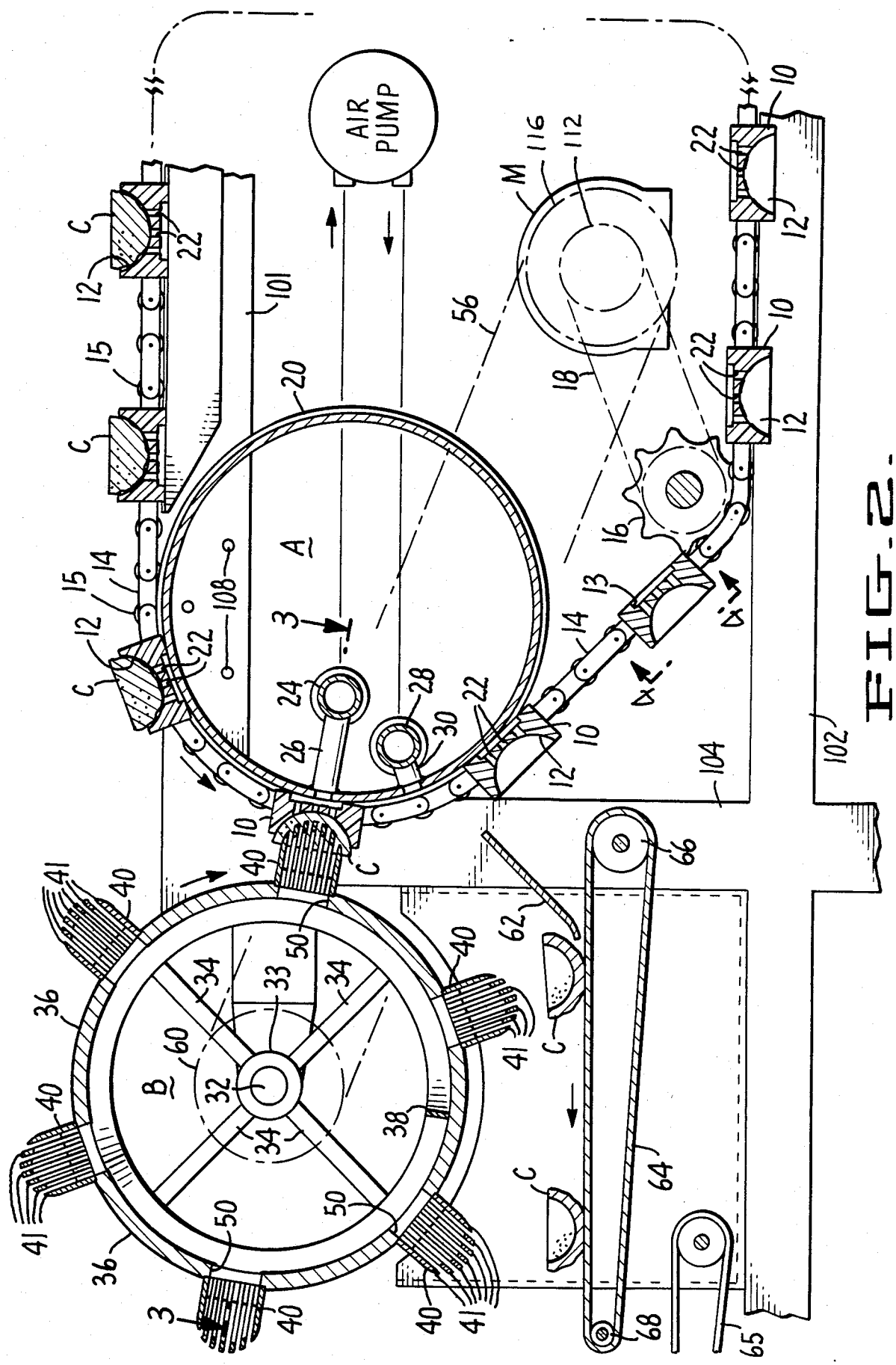
FIG. 2 is a view in side elevation partly in section and somewhat enlarged of part of the machine showing the knife cutters as mounted on a rotary drum and the opposed drum adapted to hold the potato parts for processing according to the invention.

Essentially the scooping apparatus (see FIG. 2) comprises a pair of drums A and B mounted on parallel axes within frame F and spaced from each other. In the disclosed embodiment drum A and drum B are of substantially the same diameter. Drum A is mounted on cross members 101 by bolts 108 and is intended to remain in a stationary or fixed position and not rotate around its axes. Outer shell or wall 20 of drum A is adapted to have endless chain conveyor 14 roll over its outer periphery all as shown in FIG. 2.

Figure 3:
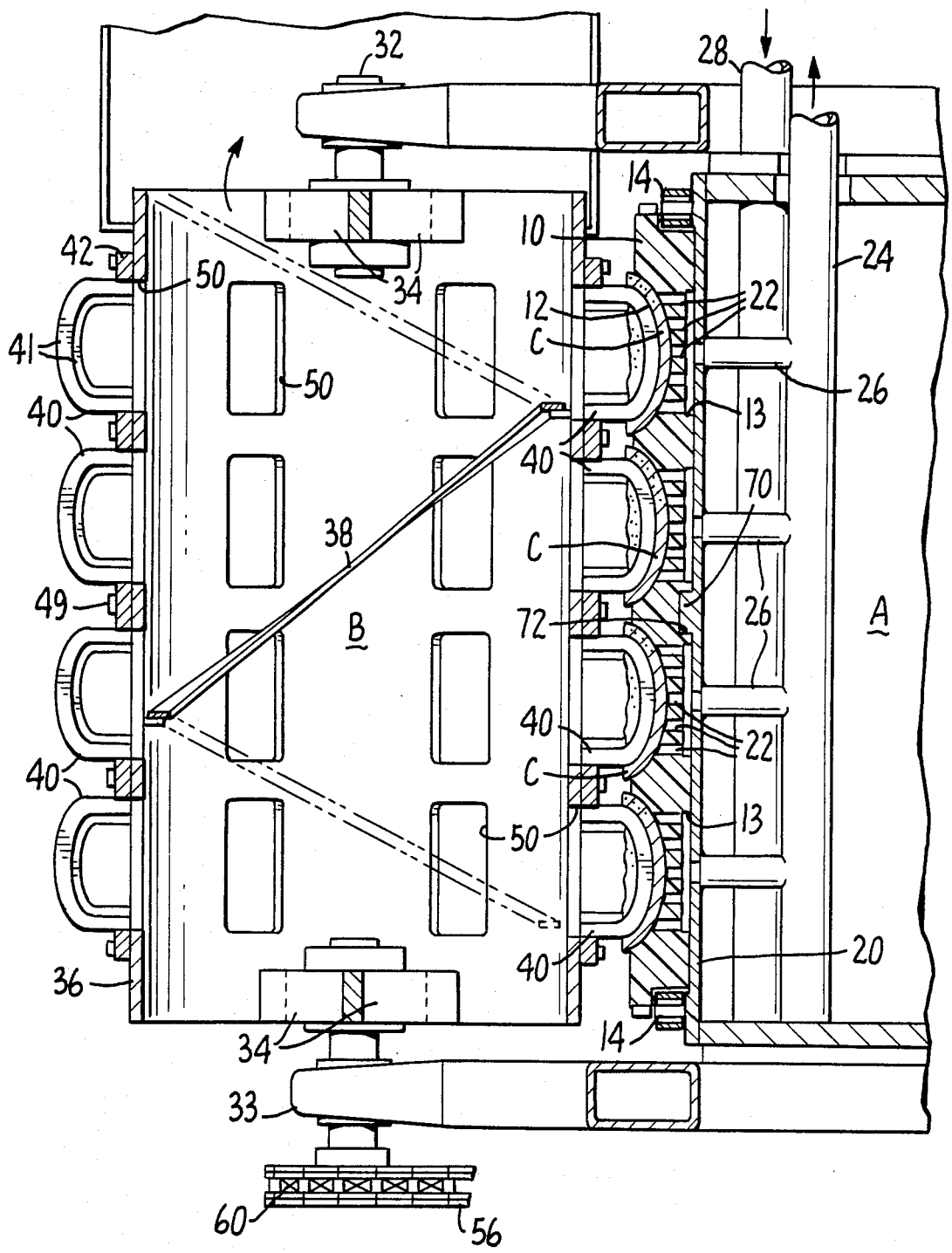
FIG. 3 is a sectional view through line 3—3 of FIG. 2 looking in the direction of the arrows showing the rotary drum, a tray assembly, and part of the stationary drum.
Figure 4:
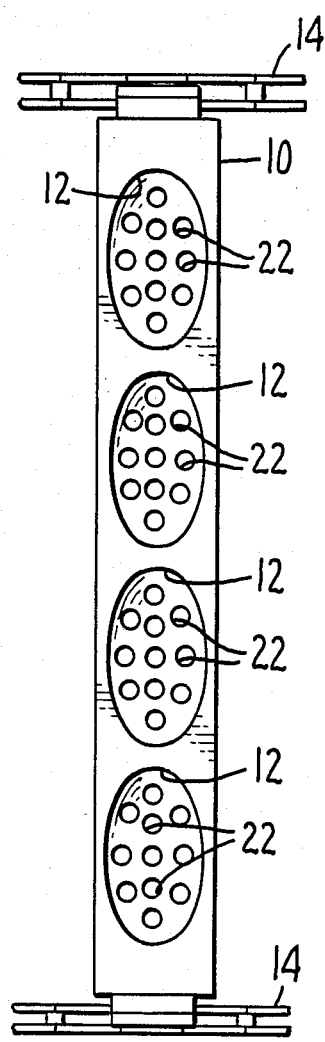
FIG. 4 is a top plan view of a potato part holding tray assembly taken along line 4—4 of FIG. 2, looking in the direction of the arrows.

A circumferential ridge or peripheral abutment 70 is provided on the outer wall 20 of drum A. A corresponding slot 72 has been made in the base of tray assemblies 10 that slide over drum A. The ridge 70 is thus designed to slide within slot 72 and serve as a tracking means so that assemblies 10 are restrained from lateral movement or wandering, and particularly during the meat digging and scooping operation, all as shown in FIG. 3.

Figure 1:
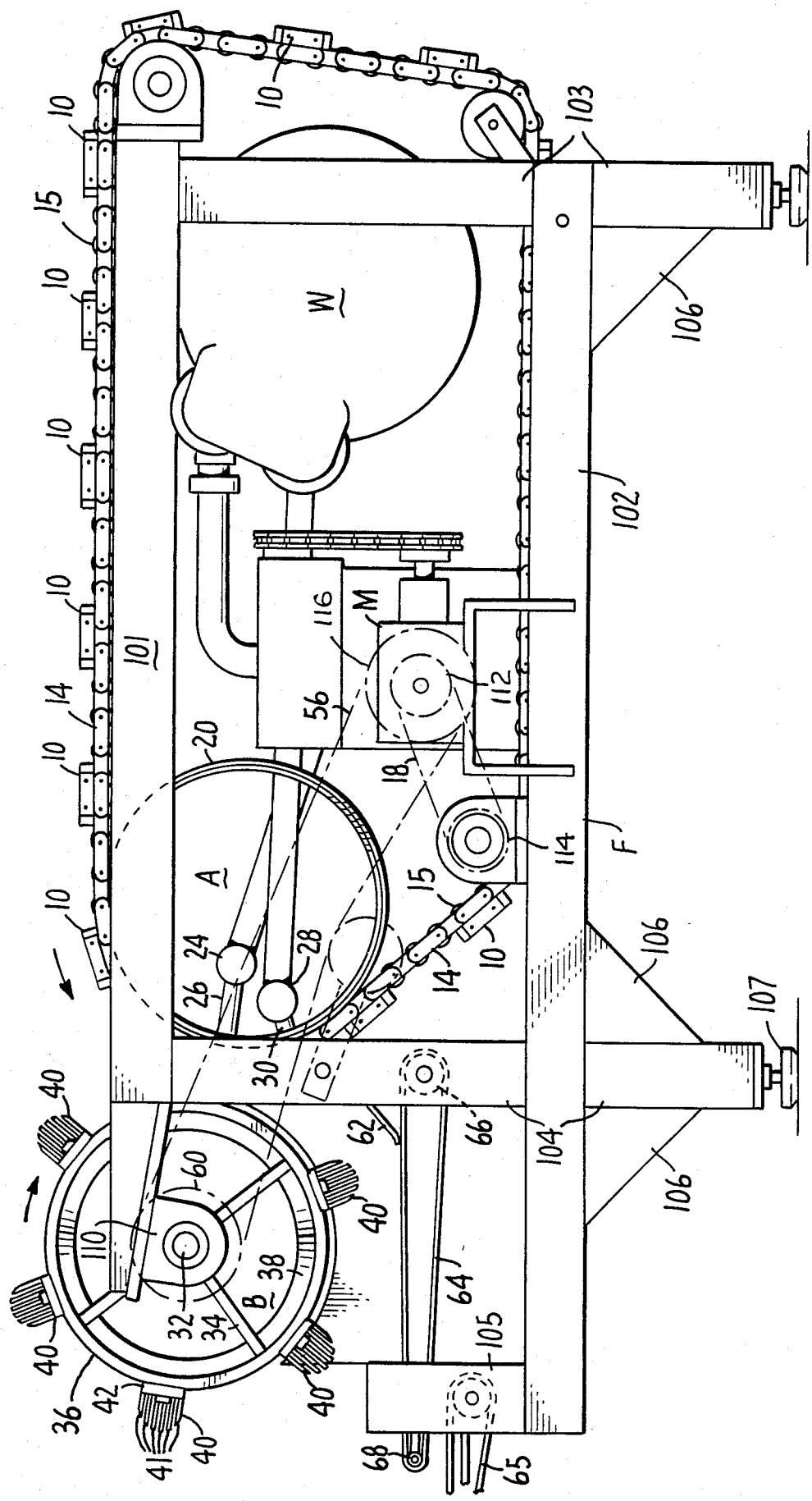
FIG. 1 is a view in side elevation of the machine showing the rotary drum upon which the knife cutters are mounted, a continuous conveyor having a plurality of trays with molds for holding potato parts to be processed, a stationary drum about which the conveyor rolls, means for driving the rotary drum and the conveyor and for providing a vacuum and an air blast, and associated parts.

FIG. 1, chain conveyor 14 may be of any conventional design and advantageously can take the form of a conveyor roller chain that is arranged to mesh with sprocket 16. A variable speed electric or hydraulic motor M of any conventional design serves as the driving means for the chain 14 so that a driving chain 18 connects sprocket 112 at one end to motor M and at its opposite end to sprocket 114 which actuates sprocket 16 which in turn moves chain 14. In the preferred embodiment a pair of chains 14 are employed each of which is located adjacent the opposite ends of stationary drum A. The chain structure includes rollers 15 which are mounted at spaced points between the links of chain 14 to facilitate movement thereof along wall 20 of drum A.

A plurality of tray assemblies 10 are connected at equally spaced intervals to each chain 14 in a position parallel to the drum axis and thus extend across most of the length of drum A. The tray assemblies 10 are adapted to include one or more individual receptacles or cup shaped molds 12 having a generally concave contour corresponding to the average shape of a potato so as to accomodate, with minimum deformation to the product, a product such as one half of a baked potato sliced along its length.

As is apparent from the drawings (See FIGS. 1, 2, 4, 5 & 6) cup shaped molds 12 form part of tray assemblies 10 so that they are fixedly mounted thereon and do not move except as tray assemblies 10 rotate around drum A. Accordingly, a potato half when positioned therein remains stationary during the operation as hereinafter described.

It is to be understood that any shape of potato can be used in this apparatus, including conventional oblong, round or other shapes.

The base of each tray assembly 10 has hollowed out areas 13 which are immediately below molds 12 and which function as a plenum or manifold as described hereinbelow. Several tubular passages 22 are advantageously provided in cup shaped molds 12 and run from plenum 13 to the face of molds 12 wherein potato halves C are placed. Plenum 13 and passages 22 in the tray assemblies 10 cooperate with vacuum tubes 26 (see FIG. 3) which are in communication with vacuum manifold 24, all of which are positioned within stationary drum A. A conventional vacuum pump W or other means is in communication with manifold 24 for providing the requisite vacuum effect or negative pressure within the tube for retaining the product in the cup shaped mold 12.

In the present embodiment it has been found desirable to use as pump W a regenerative blower which is adapted to create a vacuum sufficient to provide the necessary suction to firmly hold the potato halves during the scooping or digging operation and at the same time to provide sufficient air for the blast means to eject the potato skin products from molds 12 that are prepared according to the invention, all as described hereinafter.

Rotary drum B is suspended at each of its ends from horizontal cross-members 101 by journal bearing supports 110 (see FIG. 1) and is adapted to rotate within them about shaft 32. Drum B is driven by chain 56 which runs from motor M sprocket 116 to sprocket 60. Drum B has a series of spokes 34 which run from hub 33 to the inside of wall 36 of drum B. Spirally arranged about the inside of wall 36 are feeder blades 38 which furnish an auger effect to help direct the discharge of potato pulp as will be more fully disclosed hereinafter.

Any conventional adjustment means well known to those skilled in the art may be used to move drum B to adjust the distance or spacing between drums A and B. In the present embodiment support bearings 110 and shaft 32 may be moved horizontally in either direction thereby changing the position of Drum B with respect to Drum A.

A plurality of knife assemblies 40 are located about the outer periphery of rotary drum B at a predetermined number and spacing. Drum B rotates at a speed whereby knife assemblies 40 synchronize and cooperate with molds 12 in trays 10 as they pass each other at the closest point between the drums.

Knife assemblies 40 are each comprised of a base plate 42 mounted on drum wall 36 by bolting or the like 49 and a plurality of spaced plates or blades 41 having arcuate cutting edges arranged so as to comprise a rounded elongated head with long slots. Spaced plates 41 normally are of a wear resistant alloy and have sharp cutting edges. There are openings 50 in drum wall 36 over which the base sections 42 of knife assemblies 40 are positioned. Accordingly, the open area comprising the slots 48 between plates 41 is in communication with openings 50.

Each tray assembly 10 on roller chain conveyor 14 which moves about drum A and each knife assembly 40 mounted on rotary drum B is spaced an equal distance from its adjacent corresponding assembly, as above noted. Also, their respective positions about opposed drums A and B is such that the tray assembly 10 and knife assembly 40 are in complete registry when they are in positions about the respective drums A and B which represent the shortest distance between the drums. In the present embodiment drum B and chain 14 are adapted to move at the same relative speed.

The operation is synchronized due to the movement of chains 14 and thus tray assemblies 10 with molds or receptacles 12 about drum A, at the same angular speed as the correspondingly spaced knife assemblies 40 mounted on outer wall 36 of drum B. This synchronized motion of molds 12, the female member, with knife assemblies 40, the male member, causes halved baked potatoes placed in molds 12 to be scooped-out when they approach and are at the shortest distance between their respective drums (see FIGS. 2, 5, and 6).

The operation of the tray assemblies 10 is such that potato halves C are retained by gravity in cups or molds 12 until the chain brings the molds to the point that plenums 13 in the bases of tray assemblies 10 are in communication with vacuum tubes 26 whereupon the effect of the vacuum applied through manifolds 24, tubes 26, plenums 13 and passages 22, firmly retains the potato parts in molds 12 to permit knife assemblies 40 to disengage from the potato shell. Drum B and chain 14 due to the synchronized movement, then enables plates 41 of knife assembly 40 and the molds 12 of assemblies 10 to mate evenly at the closest points of contact. The knife assembly 40, as the male member, is of a size and shape whereby removal of a requisite amount of meat from potato half C is carried out while retaining a desired measured meat thickness in the firmly held finished potato shell C.

As heretofore mentioned, drum B can be moved to adjust its distance from drum A thus allowing the production of different thickness for shell C. The position of drum B on supports 101 and 110 may be adjusted so that the distance between drums A and B is increased or decreased and accordingly the thickness of shells C can be increased and decreased.

Figure 5:
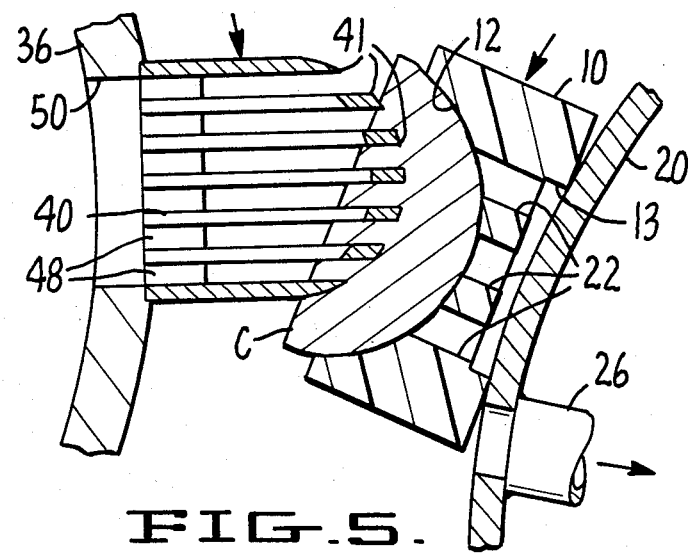
FIG. 5 and FIG. 6 are broken away sectional views of a knife assembly, a tray assembly, and stationary drum showing their relative positions during the meat removal operation.
Figure 6:
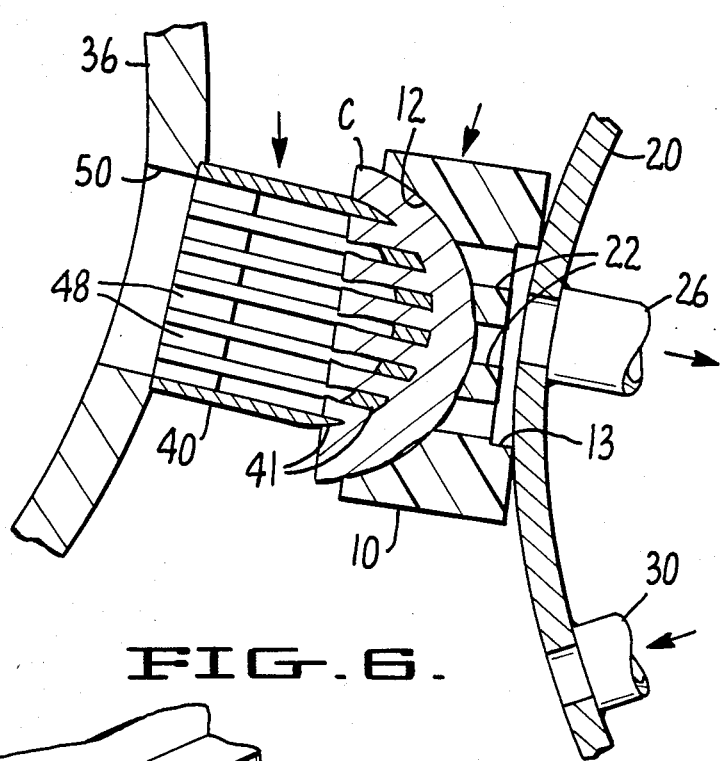
Figure 7:
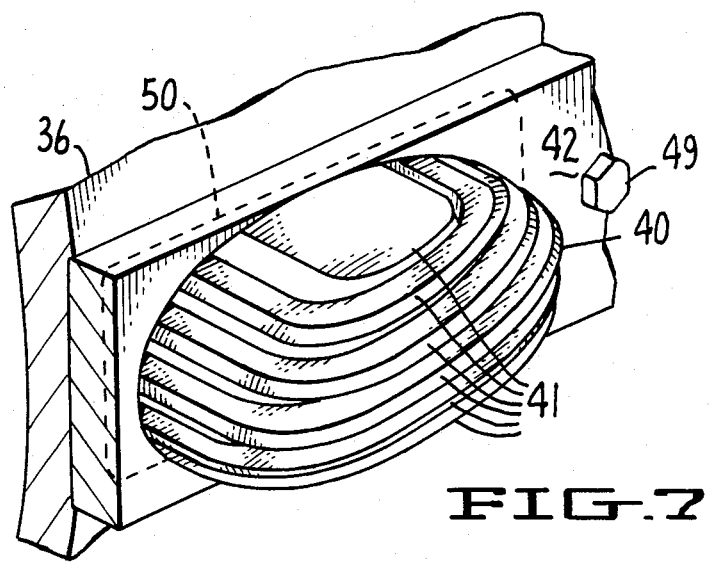
FIG. 7 is a broken away perspective view of the knife assembly comprising the cutter arrangements of the invention as mounted on the drum.

The meat that is removed from the potato halves is squeezed into slots 48 and passes out of openings 50 in wall 36 when a subsequent shell is made. It is then removed by the auger, or scraper arrangement 38, where it is augered out to a conveyer or other receiving means. Meanwhile, chain 14 continues to move and trays 10 pass out of the vacuum tube communication area and as the chain descends the shell is discharged by gravity and the application of positive pressure of a jet of air through manifold 28 and tubes 30 whereby the shell is ejected onto slide 62. The shells are received on a first continuous conveyer 64 at spaced locations and then tumbled onto a second similar conveyor 65 and are threafter removed at packing stations or for further treatment as desired. This second conveyor serves to remove excess loose potato meat from inside of potato shell. FIGS. 5 and 6 show in close detail the movement of knife assembly 40 and trays 10 whereby the potato meat is dug out of the shell C as it is firmly gripped under vacuum.

In the present embodiment a series of four molds or cups 12 are provided on each tray 10. This arrangement can be modified to handle fewer or substantially larger numbers of potato halves. Correspondingly, the number of mating male knife assembly members utilized to scoop out the meat or pulp can be increased or decreased to change the rate of productivity of the apparatus.

The potato products to be treated are fed to the cups or molds 12 by hand or by machine and, as previously stated, can be removed the same way.

Although the apparatus shown in the embodiment disclosed herein over which roller chain 14 passes in the operation thereof is in the form of cylindrical drum A as shown in the drawings, it is to be understood that this part may be modified so that any arcuate shaped means is substituted for the drum. Such means should have a surface providing a path of travel and track about the length of the circumference of the drum over which the roller chain conveyor is in contact. Accordingly it is to be understood that the term stationary drum for drum A as used herein is intended to encompass such an arcuate shaped arrangment. It is to be further understood that the term rotary drum for drum B as used herein is intended to encompass any cylindrically shaped arrangement such as a hexagon or octagon for example with any desired number of sides or positions for attaching knife assemblies.

I claim:

1. Apparatus for preparation of potato skins from cut baked potatoes comprising
    a first stationary cylindrical drum,
    a continuous roller chain conveyor means arranged to travel around part of the outer wall of said drum and having a plurality of tray assemblies connected thereto at predetermined spaced apart positions along the length of said conveyor means,
    said tray assemblies extending axially across said drum and generally parallel to the central axis thereof,
    at least one cup shaped mold forming part of each of said tray assemblies and shaped to receive part of a potato for processing,
    a vacuum means associated with each said cup shaped mold for firmly holding said potato part therein during said processing,
    a pressure means associated with each said cup for positively discharging a processed potato shell,
    a second drum adapted to rotate about its central axis, said first and said second drum being in spaced parallel relation to each other over the respective portions thereof positioned adjacent to each other,
    a plurality of knife assemblies attached to the outer wall of said second drum at predetermined radially spaced apart positions corresponding to the spacing of said positions of said tray assemblies associated with said first drum,
    at least one cutter unit comprising a plurality of spaced parallel arcuate blades mounted on each of said knife assemblies and having open slots between and beneath said blades, and
    means for synchronizing the movement of said tray assemblies about said first stationary drum with the movement of said knife assemblies about said second rotary drum whereby said cup shaped molds and said cutter units meet to scoop potato meat from said potato part.

2. The apparatus of claim 1 wherein each of said tray assemblies have a plurality of separate cup shaped molds for receiving a potato part.

3. The apparatus of claim 1 wherein each of said tray assemblies has a hollow plenum chamber in the base thereof associated with and just opposite to each said cup-shaped mold and a plurality of tubular passages extending from each said plenum chamber to each said cup shaped mold.

4. The apparatus of claim 3 wherein said vacuum means comprises vacuum pump means, manifold and tube means whereby said vacuum means extends to each said plenum chamber and each of said tubular passages to thereby provide vacuum means for firmly holding said potato part in said cup shaped mold during said processing operation.

5. In the apparatus of claim 1 air pressure means located beyond said scooping point whereby said potato part is ejected for recovery by means of a manifold and tubes extending from said air pressure means to each said plenum chamber connected to each said cup-shaped mold by means of said tubular passage.

6. The apparatus of claim 1 wherein the means for sychronizing the movement of said tray assemblies and said second drum comprise motor driven means for moving said conveyor chain and said second drum at the same relative speed whereby each said cup shaped mold on said tray assemblies and each said cutter unit on said knife assemblies mesh at the point where said conveyor chain and said drum are closest to each other to thereby scoop potato meat from said potato part.

7. The apparatus of claim 1 wherein said roller chain conveyor means comprises a pair of roller chains positioned at each end of said stationary drum over which said conveyor chain moves and to which each of said axially extending tray assemblies are attached.

8. The apparatus of claim 7 wherein tracking means are provided on said first stationary drum surface whereby said tray assemblies are maintained in position during the movement thereof by said roller chain conveyor around said drum.

9. In the apparatus of claim 1 means for moving at least one of said drums closer to or further away from the other said drum whereby the distance between said knife assemblies and said tray assemblies are adjusted to vary the depth of cut in said potatoes during said scooping process.

10. Apparatus for extracting potato meat from a baked potato to form edible potato shells having a known thickness of potato meat and skin and to recover the extracted potato meat comprising:

means forming a stationary drum surface having an arcuate surface over at least a portion of its exterior, continuous link chain means arranged to travel circumferentially over said arcuate surface of said drum and having a plurality of tray assemblies, each of said assemblies being carried by a link of said chain and at predetermined spaced apart positions along the length thereof, said tray assemblies extending generally parallel to the central axis of said arcuate surface, at least one but not limited to one cup-shaped mold positioned on each of said tray assemblies and adapted to receive part of a potato from which the meat is to be extracted, vacuum means associated with each said cup-shaped mold for firmly holding said potato part therein during such extraction, a cylindrical drum having a side corresponding to said knife assembly mounting positions and adapted to rotate about its central axis, said stationary drum having the axis of its arcuate portion parallel to and spaced at a predetermined distance from the axis of said cylindrical drum, a plurality of knife assemblies attached to of said cylindrical drum at predetermined spaced apart positions corresponding to the spacing of said link supported tray assemblies, scoop means having at least one arcuate blade means mounted on each of said knife assemblies, and means for synchronizing the velocity of said tray assemblies about said arcuate surface of said stationary drum with the velocity of said knife assemblies about said cylindrical drum whereby said cup-shaped molds and said scoop means meet to extract potato meat to a predetermined depth from said potato part to permit separate recovery of both the potato shell and the extracted potato meat.

11. The apparatus of claim 1 wherein said knife assemblies are mounted over and in communication with openings in the walls of said rotating second drum to thereby provide for discharge of said potato pulp into said second drum, and auger means within said second drum for removing said discharged potato pulp.

* * * * *